Patented Aug. 10, 1937

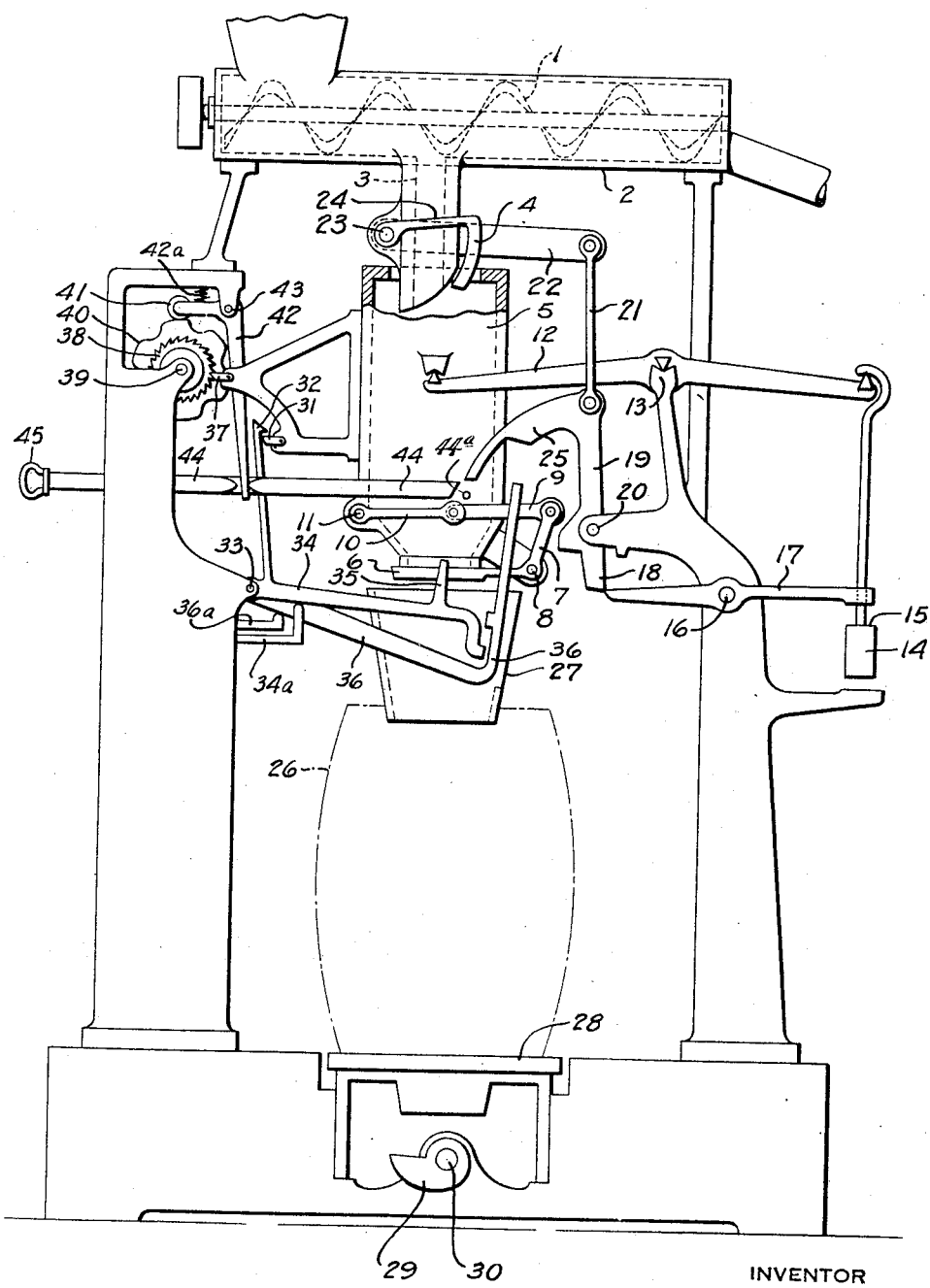

2,089,526

UNITED STATES PATENT OFFICE 2,089,526

MACHINE FOR FILLING BARRELS

Arno Andreas, Munster, Germany, assignor to Bagpak, Inc., New York, N. Y., a corporation of Delaware.

Application October 22, 1931, Serial No. 570,333
In Germany October 28, 1930

7 Claims. (Cl. 249—53)

This invention relates to the compact filling of powder-like and granular material into barrels, bags and similar containers. It has already been suggested to weigh the material first and thereupon deposit it in the container, in order to allow for shaking the container during the filling. With containers of large content, as for instance, barrels or large bags, however, difficulties are caused by throwing thereunto at one time, the entire quantity weighed, for the reason that there results a strong whirling up of the material and an excessive amount of dust. Furthermore, the scales must be dimensioned exceptionally large in order to be able to receive the entire amount for filling the container. Moreover, it has been found that in spite of the shaking, the material, when filled in at once, on account of its large quantity or weight, does not settle compactly, so that oversize containers are necessary, and a subsequent settling of the material occurs, resulting in the formation of empty spaces in the containers. On the other hand much valuable time is lost if the weighed material is allowed to run slowly out of the weighing receptacle, for the reason that in such event the weighing device during this period is not available for the next filling operation. On the other hand the time for the filling of the weighing receptacle, in order to maintain the usual output in a given period, would have to be even shorter than that required for the filling of the container inasmuch as the removal of the latter, after the filling is completed, takes but a moment, and in this event the accuracy of the weighing would be bound to detrimentally be affected.

The present invention aims to avoid these disadvantages and affords the possibility of conveying the material slowly into the receptacle to be filled, while at the same time thoroughly shaking same, without it being necessary that the weighing device have excessively large dimensions or remain idle for any length of time. This result is obtained in accordance with the invention, by making the weighing receptacle considerably smaller than the container to be filled so that only a part of the total quantity to be filled, is weighed at a time. This partial quantity can be placed at one time into the container or receptacle in the same manner as is done without difficulty in connection with containers of small content, so that the emptying of the weighing receptacle takes place in one operation and the scale is immediately again available. In this manner it is, therefore, possible for the entire available time to be utilized for a slow filling of the weighing receptacle, for accurate weighing. During the weighing period, the material previously placed by parts in the barrel is shaken. In this manner the intervals between the individual emptying operations of the scale which are necessary in order to effect repeated filling of the scale and weighing allow for the settling of the partial quantity placed into the receptacle, so that especially by reason of the shaking there is effected a compact settling of the last batch of material, while at the same time the previously deposited material is settled even more firmly.

If an exceptionally rapid filling of the receptacle is to be accomplished, several scales can be arranged so as to empty their contents jointly into the one container, but preferably not simultaneously, so that every portion of the material is deposited and shaken separately, the next quantity being deposited in the container only after a short interval, serving for the settling of the previous quantity.

In the drawing there is shown an embodiment of the device made in accordance with the invention, illustrating the device in the position at which the receptacle is nearly filled and is moving downwardly just prior to closing of the filling valve and opening of the discharge valve.

From a feed worm 1, the material to be filled is fed or conveyed continuously along the length of the chamber 2, so that the material runs downward through the outlet 3, while the valve 4 is open, as shown in the drawing. The falling material reaches the weighing receptacle 5, which is closed at the bottom by the flap valve 6. This valve is arranged on a bell crank lever 7, which is pivoted on the pin 8, on the receptacle 5, and at its other end, and by means of the member 9, is joined to the rod 10, which is pivoted at 11 on the weighing receptacle. The rod 10 forms a knee joint with the member 9, which joint is stretched in the position shown in the drawing, i. e. when the bottom flap 6 is closed.

The weighing receptacle 5 is suspended on a balance arm 12, which rests in the bearing 13 of the machine frame, and which carries at its other end the weight 14. By this weight 14 the scale beam 12 is pulled into its end position, and in this way the scale receptacle 5 is raised to its highest position. The incoming material, which accumulates in the weighing receptacle 5, causes the scale beam 12 to balance, when the weight 14 through its projection or nose 15, presses against the one end of the lever 17, which swings about the stationary pivot 16, so that its other end is released from the tooth 18, which is provided on the lever 19, the latter being supported on the stationary pin 20. To the upper end of lever 19 the rod 21 is joined, while its other end engages the lever arm 22, which is fastened on the shaft 23, which in turn is supported on the outlet tube 3. Arm 24 fastened to arm 23 carries the flap 4. The lever 19 forms with the rod 21 another knee joint which in the position shown in the drawing, that is flap 4 being open, is also in stretched position.

Upon the release of the tooth 18, the lever, by the excess weight of its extension 25, is turned so that the knee joint 19/21 bends, when the lever 22 turns the shaft 23, and in this way the outlet 3 is closed by the flap 4 so that the admission of the material into the weighing receptacle 5 is interrupted. The lever 19 during its turning strikes, with its extension 25, against the knee joint 9/10 and bends same, whereby the outlet flap 6 opens, so that the weighed material enters the barrel 26 through the filling hopper 27 carried on same.

The barrel 26 rests on the table 28 which is arranged on the lower frame of the machine in a vertically slidable manner, and which table can be shaken. Cam 29 raises it and lets it drop upon rotation of the shaft 30, which carries the cam and is supported in the frame.

As soon as the material has dropped out from the weighing receptacle 5, the latter, due to its release, is again pulled upward by the weight 14. In this operation the pawl 31, which is arranged on the receptacle in a turnable manner, carries along the hook 32, and thereby swings upward the lever 34 which is pivoted on the pin 33 on the frame, so that the said lever urges, by means of its finger 35, the knee joint 9/10, back into the stretched position, in this way closing the bottom flap 6. The lever 34, after a certain upward movement, engages the dog of the lever 36, which is also pivoted on the pin 33, and takes same along in its upward movement so that with its upper end it raises the extension 25, and straightens the knee 19/21, whereby the upper flap 4 is again opened, so that material again flows into the weighing receptacle 5.

Due also to the turning of the lever 34 the hook 32 is moved to the left in the drawing and away from pawl 31, so that the lever 34 and together with it, the lever 36, fall back into their initial position shown in the drawing, where they are supported, respectively by stops 34a and 36a.

On the weighing receptacle 5 there is also provided a second pawl 37, which upon the upward movement engages a ratchet wheel 38, which is arranged on the shaft 39 on the machine frame and with which a cam 40 is connected. This cam 40 is provided on its circumference with a recess for every third tooth of the ratchet wheel 38. On the circumference of this cam 40, there runs a roller 41 which is arranged on the crank lever 42 which is turnable around the pin 43 of the machine frame and which, with its downwardly directed shank contacts with the rod 44 which is horizontally displaceable in the machine frame. In the above mentioned operation of the weighing device, in which the weighing receptacle drops each time until the upper flap is closed and the bottom flap is opened, whereupon it again moves upward until the bottom flap 6 is closed and the upper flap is again opened, the crank lever 42 twice does not perform any movement. In the third cycle, however, the roller 41 drops into a recess of the cam 40 whereby the rod 44 is shifted in the horizontal direction with the aid of spring 42a. The sequence of operation of the device in the form illustrated is such that stopping of the device, after a certain number of weighings, occurs before the opening of flap 4 so that in the stopped device the weighing receptacle is empty, for which purpose the upward movement of the weighing receptacle 5 is arrested after starting by the movement of rod 44, so that further upward movement of the weighing receptacle 5 can only take place after the rod 44 is again pulled out, the flap 4 meanwhile remaining closed. Upon such further upward movement of the weighing receptacle the flap 4 is opened and a succeeding number of weighing operations take place until the roller 41 again drops into a recess of the cam 40.

The drawing illustrates the device in an intermediate stage of the movement of receptacle 5, the exact position being the stage at which receptacle 5 is nearly full and is moving downward, the flap 4 being opened and the bottom flap 6 being closed and holding the material in the receptacle. Shortly afterward the receptacle has moved down far enough to cause the weight 14 to strike lever 17 and release the tooth 18, whereupon the extension 25 drops and breaks the knee-joint 9, 10 thereby closing flap 4 and opening bottom flap 6 as seen in the figure. As the material runs out of receptacle 5 the receptacle begins to rise thereby lowering the weight 14 towards its supporting arm and causing the lever 17 to assume a position at which it is able to latch tooth 18. The flap 4 and bottom flap 6 remain in position until shortly after the cam 40 is rotated by pawl 37. If the roller 41 drops into a recess in the cam 40 rod 44 will be shifted to the right and will overlie a locking stud 44a provided on the wall of the receptacle 5. The stud 44a projects from said wall a distance sufficient to be engaged by the rod 44 but not such a distance as to interfere with the movement of extension 25 of the member 19. The receptacle 5 will continue to rise under the influence of weight 14 until the stud engages with the rod 44. Further upward movement of the receptacle 5 is thereafter prevented and the receptacle remains in position with the flap 4 closed. At this point the operator removes a filled barrel, places an empty barrel beneath the machine and pulls the handle on rod 44 outward. This releases the engagement between the rod 44 and stud 44a so that weight 14 can continue to lift the receptacle 5.

The upward travel of the receptacle 5 closes the flap 6 and opens flap 4 in the following manner. Pawl 31 engages hook 32 thereby raising lever 34 from its support 34a. The finger 35 engages knee-joint 9, 10 and straightens the same, closing flap 6. Further upward movement of the receptacle 5 will be followed by further movement of the lever 34 to engage the dog on lever 36. The lever 36 will then be rocked upwardly away from its support 36a to engage and straighten knee-joint 19, 21 to open flap 4. In the straightening of the knee-joint 19, 21, tooth 18 momentarily depresses lever 17 until the tooth is latched by the lever. The final fractional movement of receptacle 5 causes hook 32 to be released from pawl 31 and levers 34 and 36 drop to their initial position. Receptacle 5 will now be automatically filled and emptied a number of times until roller 41 again drops into a recess in cam 40.

The cam 40 can be replaced by another having any suitable number of divisions, so that the device is stopped after any desired number of charges have been weighed.

The pawls 31 and 37 are constructed in any well known manner so that upon the lowering of the weighing receptacle they slide over the faces of the teeth or of the hook 32.

In order to increase the accuracy of the weighing, full and dribble feed valves of known construction may be substituted for the valve 4.

Moreover, it goes without saying that the parts are advantageously arranged so that the scale does as little actual work as is possible, in order to keep it accurate.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a filling machine, the combination of an automatic weighing machine adapted to weigh and deposit successive amounts of finely divided material, said weighing machine including a weighing receptacle having a discharge valve at the bottom thereof, and a balance arm supporting said receptacle, with means comprising a member fixed to said weighing receptacle, a ratchet wheel and an associated cam rotated by said member, and a locking bar cooperating with said cam for preventing said receptacle from being filled after a predetermined number of cycles, said mechanism being independent of said balance arm.

2. In a filling machine, the combination of an automatic weighing machine adapted to weigh and deposit successive amounts of finely divided material, said weighing machine including a weighing receptacle having a discharge valve at the bottom thereof, a conduit through which material enters said weighing receptacle, a filling valve associated with said conduit for closing said conduit when the proper amount of material has been received in said receptacle, said receptacle being provided with means for preventing said filling valve from being opened after a predetermined number of cycles, said means including a tooth carried on the receptacle and mechanism operable by said tooth during upward movement of said receptacle after discharge and operative after a predetermined number of engagements to prevent automatic opening of the filling valve.

3. In a filling machine, the combination of an automatic weighing machine adapted to weigh and deposit successive amounts of finely divided material, said weighing machine including a weighing receptacle having a discharge valve at the bottom thereof, a conduit through which material enters said weighing receptacle, a filling valve associated with said conduit for closing said conduit when the proper amount of material has been received in said receptacle, said receptacle being provided with means for preventing said filling valve from being opened after a predetermined number of cycles, said means including a tooth carried on the receptacle, a ratchet carried on a stationary member and engageable by said tooth, and mechanism operatively connected to the ratchet and adapted to prevent automatic opening of the filling valve after a predetermined number of engagements of the tooth with the ratchet.

4. In an automatic weighing machine including a weighing receptacle having a discharge valve, and a valve for controlling admission of material to the receptacle, said weighing receptacle being mounted upon a balance for downward movement under full weight, means for operating the valves including an overbalanced arm adapted to cause the discharge valve to open, means to maintain the arm in operative position during filling of the receptacle and to release it upon full weight being reached, operative connections between the arm and the other valve for closing the latter upon overbalancing of the arm, and means comprising a pivoted lever having a hook and a tooth attached to said receptacle adapted to engage upon upward movement of said receptacle after discharge to return said arm to normal position.

5. In an automatic weighing machine including a weighing receptacle having a discharge valve and means to hold the valve in closed position, and a valve for controlling admission of material to the receptacle, said weighing receptacle being mounted upon a balance and downwardly movable under full weight, means for operating the valves including an overbalanced arm adapted to release the valve holding means to open the discharge valve, means to maintain the arm in operative position during filling of the receptacle and to release it upon full weight being reached, a link pivoted between the arm and the other valve for closing the latter upon overbalancing of the arm, and means comprising a pivoted lever having a hooked extension and a tooth attached to said receptacle adapted to engage upon upward movement of said receptacle after discharge to return said arm to normal position.

6. In an automatic weighing machine including a weighing receptacle having a discharge valve and toggle linkage to hold the valve in closed position and a valve for controlling admission of material to the receptacle, said receptacle being mounted upon a balance and capable of downward movement under full weight, means for operating the valves including an overbalanced arm adapted to break the toggle to open the valve, means to maintain the arm in operative position during filling of the receptacle and to release it upon full weight being reached, operative connections between the arm and the other valve for closing the latter upon overbalancing of the arm, and means to return said arm to normal position comprising a pivoted lever having a hooked extension and a tooth attached to said receptacle, said tooth being so mounted as to pass over and engage with said hooked extension upon downward movement of said receptacle whereby to lift said pivoted lever upon upward movement of said receptacle after discharge.

7. In a filling machine, a weighing receptacle, a source of material, means providing communication between said source and said receptacle, said receptacle having a discharge valve through which material may be released into a container located to receive material from said receptacle, means responsive to the accumulation of a predetermined quantity of material in said receptacle for causing communication between said source and said receptacle to be obstructed and said discharge valve to be opened, means responsive to emptying of said receptacle for causing said discharge valve to be closed and communication between said source and said receptacle to be established, means comprising a ratchet wheel and an associated cam rotated step by step upon each weighing and discharging operation, and a rocking member actuated by said cam for automatically preventing said container from receiving material after a predetermined number of discharges from said receptacle, and means for continually shaking the container for settling the material in said container during the weighing and releasing of the successive predetermined amount of material.

ARNO ANDREAS.